United States Patent
Mahr (10) Patent No.: US 6,873,577 B1
(45) Date of Patent: Mar. 29, 2005

(54) OPTICAL HEAD POSITION CONTROL FOR OPTICAL RECORDING DEVICE

(75) Inventor: Peter Mahr, Weiler (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/486,512

(22) PCT Filed: Jun. 21, 1999

(86) PCT No.: PCT/EP99/04280

§ 371 (c)(1),
(2), (4) Date: Feb. 28, 2000

(87) PCT Pub. No.: WO00/02198

PCT Pub. Date: Jan. 13, 2000

(30) Foreign Application Priority Data

Jul. 3, 1998 (EP) ............................................ 98401671

(51) Int. Cl.⁷ ............................................... G11B 21/08
(52) U.S. Cl. ................................ 369/30.17; 369/30.27; 369/33.01
(58) Field of Search .......................... 369/30.27, 33.01, 369/30.17, 30.16, 30.1, 30.11, 30.12, 30.13, 30.14, 30.18, 44.28, 44.27, 44.29

(56) References Cited

U.S. PATENT DOCUMENTS

| | | | |
|---|---|---|---|
| 4,680,746 A | * 7/1987 | Senso | 369/47.39 |
| 4,851,755 A | 7/1989 | Fincher | 318/696 |
| 4,977,539 A | 12/1990 | Lee | 369/44.11 |
| 6,172,946 B1 | * 1/2001 | Furukawa et al. | 369/30.16 |

FOREIGN PATENT DOCUMENTS

| | | |
|---|---|---|
| EP | 0443847 | 8/1991 |
| EP | 0617416 | 9/1994 |
| EP | 0800128 | 10/1997 |
| JP | 05-56690 | 3/1993 |

OTHER PUBLICATIONS

*Patent Abstracts of Japan, vol. 017, No. 371, Jul. 13, 1993 and JP Patent 5–056690.

* cited by examiner

Primary Examiner—Tan Dinh
(74) Attorney, Agent, or Firm—Joseph S. Tripoli; Harvey D. Fried; Francis A. Davenport (57) ABSTRACT a data player or a method in which a reading and/or writing head is positioned according to anyone of 3 methods or combinations thereof: Calculating a desirable speed curve to position the head from a first to a second position and adjust the speed of the head's movement to the desirable speed, calculating and outputting an amount of energy to a driving mechanism to move the head a determined number of steps, increasing the power applied to a driving mechanism until the head is moved for one step. The positioning may additionally be used to perform coarse positioning while the head is positioned on a track of a data medium using a fine positioning mechanism.

5 Claims, 11 Drawing Sheets

OPTICAL HEAD POSITION CONTROL FOR OPTICAL RECORDING DEVICE

BACKGROUND OF THE INVENTION

1. Field of the Invention

The invention relates to data players in which a reading and/or writing head is positioned relatively to a data medium being read and/or recorded.

2. Description of the Related Art

A data player and/or recorder is a device which allows to read data stored on a data medium.

The data may represent software for a computer, music or movies. Any other kind of data may be considered, either digital or analog.

The data medium may for example be a magnetic, optical or magneto-optical data carrier.

Many types of data players and/or recorders are commonly known. Some of these use tape shaped carriers, others use disk shaped carriers. The data is read from and/or written to the data medium using a data reading and/or writing head.

The data may for example be found along tracks. Typically a data medium carries a plurality of parallel tracks. To read and/or write data in a track the reading and/or writing head is positioned relatively to the track. For some operations it may be necessary to read and/or write data in a distant part of a track separated from the part of the track being read by a plurality of parallel tracks.

Figure 1:
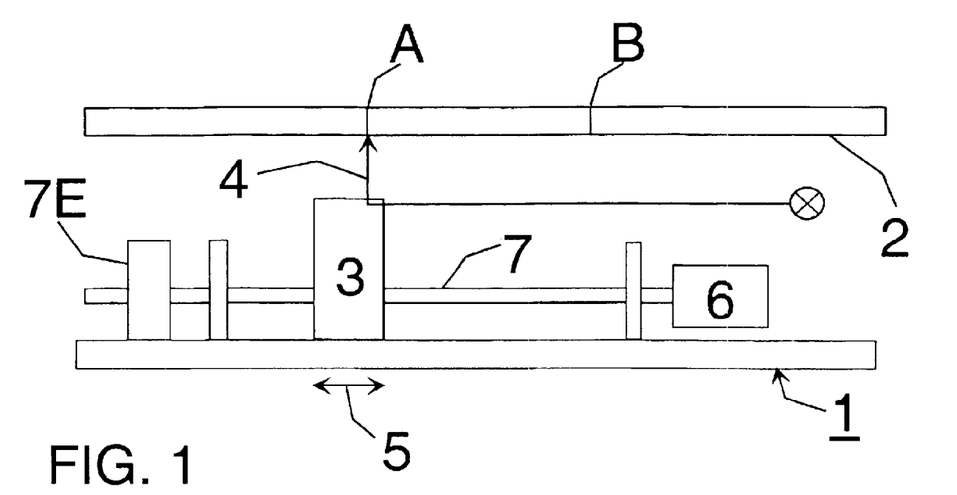

More precisely and as may be seen in the sideview contained in FIG. 1, in case the data player is an optical disk player 1 the data is stored on a disk 2 along tracks which describe concentric rings or a spiral. The data reading head 3 is an optical pick-up unit and is positioned relatively to a track to be read such that a laser beam 4 attains the track. The data reading head 3 may be moved, for example along a radial direction 5 of the optical disk 2 from a first position A to a second position B such that the laser beam 4 accesses data at the location B distant from the track being read at the location A. The distant location B and the location A are typically separated by a number of neighbored tracks. The data reading head 3 is moved using a driving unit. The driving unit may for example comprise a motor 6 which rotates an endless screw 7 oriented in the radial direction 5. The data reading head 3 comprises a nut shaped part (not shown) which cooperates with the endless screw 7 in a manner that when the endless screw 7 is rotated, the data reading head 3 moves in the radial direction 5. The position of the data reading head 3 is determined using an encoder 7E which delivers signals when the endless screw 7 is rotated. Depending on a way of rotations of the endless screw 7 the signals may cause a counter to increment or decrement a position value. The position value is used to determine the position of the data reading head 3. Many other ways of determining the position are well know by a person skilled in the art and could have been used instead of the encoder 7E described.

U.S. Pat. No. 4,977,539 discloses a compact disk player in which the optical pickup's position is determined using an encoder. The optical pickup is moved from a first to a second position which are separated by a number of tracks. Typically the optical pickup has a fixed speed of movement. The number of tracks is converted to a target number of encoder signals. While the optical pickup is moved the encoder signals are counted and compared to the target number. As soon as the number of encoder signals is equal to the target number a reverse direction braking is applied to the optical pickup. At this point the optical head passes beyond the second position and needs to be repositioned back in a direction reverse to it's first direction of movement in order to reach the second position. The higher the fixed speed, the stronger the reverse direction braking needs to be in order to brake the optical head and to position it back to the second position. This drawback in fact limits a movement's speed and thus an access time to go from the first position to the second position.

SUMMARY OF THE INVENTION

The invention provides a solution which facilitates the fast and precise positioning of the data reading and/or writing head.

In a first aspect according to the invention, a solution is seen in a data player and/or recorder in which a reading and/or writing head is positioned relatively to a data medium, comprising a driving mechanism which allows to move the reading and/or writing head with an adjustable speed, a monitoring device which allows to measure an instantaneous speed and position of the data reading and/or writing head, a calculator for calculating a desirable head speed as a function of a position of the reading and/or writing head, and a regulating circuit for regulating the adjustable speed to the desirable head speed.

In a second aspect according to the invention, a solution is seen in a data player and/or recorder in which a reading and/or writing head is positioned relatively to a data medium, comprising a driving mechanism which allows to move the data reading and/or writing head in steps of a determined steplength, a number of steps moved corresponding to an amount of energy provided to the driving mechanism, a monitoring device which allows to measure an instantaneous position of the reading and/or writing head, and a controller circuit which outputs a quantified amount of energy to the driving mechanism which corresponds to a final number of steps separating the instantaneous position and a determined final position of the reading and/or writing head.

In a third aspect according to the invention, a solution is seen in a data player and/or recorder in which a reading and/or writing head is positioned relatively to a data medium, comprising a driving mechanism which allows to move the data reading and/or writing head in steps, a monitoring device which allows to measure an instantaneous position of the reading and/or writing head with at least a precision corresponding to a movement of one step, and a power regulating device which outputs energy to the driving mechanism, an amount of power being increased until the driving mechanism moves the data reading and/or writing head by one step, and the amount of power being reduced afterwards.

In a fourth aspect according to the invention, a solution is seen in a data player and/or recorder in which a reading and/or writing head is positioned relatively to a data medium carrying data tracks, such that the data tracks may be followed by the reading and/or writing head, comprising a driving mechanism which allows to move the reading and/or writing head in steps, a fine positioning mechanism which allows to position the reading and/or writing head with a precision greater than one of said steps without activating the driving mechanism, a power regulating device which outputs energy to the driving mechanism, an amount of power being increased until the driving mechanism moves the reading and/or writing head by one step, and the amount of power being reduced afterwards, and a correlating circuit which outputs a signal to the power regulating device depending on a state of the fine positioning mechanism.

In a fifth aspect according to the invention, a solution is seen in a data player and/or recorder in which a reading and/or writing head is positioned relatively to a data medium, comprising a slider to move the reading and/or writing head, a pulse width modulation unit, power stages which at an input receive a pulse width modulated signal from the pulse width modulation unit and at an output deliver electrical power to the slider, an encoder comprising a wheel having a determined number of holes and which turns when the slider is moved, and a light barrier part which allows to detect the holes, thereby outputting encoder signals, a timer unit which receives signals from the encoder, and a microcomputer which receives signals from the encoder and from the timer, and sends control signals to the pulse width modulation unit in order to adjust a speed of the slider.

In a sixth aspect according to the invention, a solution is seen in a method for positioning a data reading and/or writing head in a data player and/or recorder from a first position to a second position, comprising calculating a desirable head speed for the data reading and/or writing head for intermediate positions between the first and the second position, measuring an instantaneous position and speed of the data reading and/or writing head while the latter is moved from the first towards the second position, and regulating a speed of the data reading and/or writing head to the desirable head speed.

In a seventh aspect according to the invention, a solution is seen in a method for positioning from a third position to a second position a data reading and/or writing head in a data player and/or recorder using a motor which moves the reading and/or writing head in steps, comprising calculating a final number of steps which separate the third position from the second position, and outputting to the motor a quantified amount of energy which corresponds to the final number of steps to be moved.

In an eighth aspect according to the invention, a solution is seen in a method for positioning a data reading and/or writing head in a data player and/or recorder using a motor which moves the reading and/or writing head in steps, comprising increasing an amount of power at an input of the motor until the motor performs one step, and decreasing the amount of power afterwards.

BRIEF DESCRIPTION OF THE DRAWINGS

In the following examples will be described of ways to carry out the invention referring to drawings, wherein FIG. 1 contains a schematic side view of a data reading and/or writing positioning device, FIG. 2 contains a block diagram of a simplified data player according to the invention, FIG. 4 shows a speed curve, FIG. 5 contains a flowchart illustrating a method according to the invention, FIG. 6 contains a block diagram of a simplified data player according to the invention, FIG. 7 shows a curve of current values, FIG. 8 contains a flowchart illustrating a method according to the invention, FIG. 9 contains a block diagram of a simplified data player according to the invention, FIG. 10 shows a current curve, FIG. 11 contains a flowchart illustrating a method according to the invention, FIG. 12 contains a block diagram of a data player according to the invention, FIG. 13 contains a schematic representation of an encoder, FIG. 14 contains a graphical explanation of the encoder function, FIG. 15 contains a flowchart illustrating the processing of encoder signals, FIG. 16 contains a flowchart illustrating a first method according to the invention, FIG. 17 contains a flowchart illustrating a second method according to the invention, and FIG. 18 contains a flowchart illustrating a third method according to the invention.

DETAILED DESCRIPTION OF THE INVENTION

Throughout the following description same references will be used for designating same parts. It is understood that the described examples are given to illustrate the invention and are not limitative of the present invention. A person skilled in the art may well modify the described examples and remain in the scope of the claimed invention.

Figure 2:
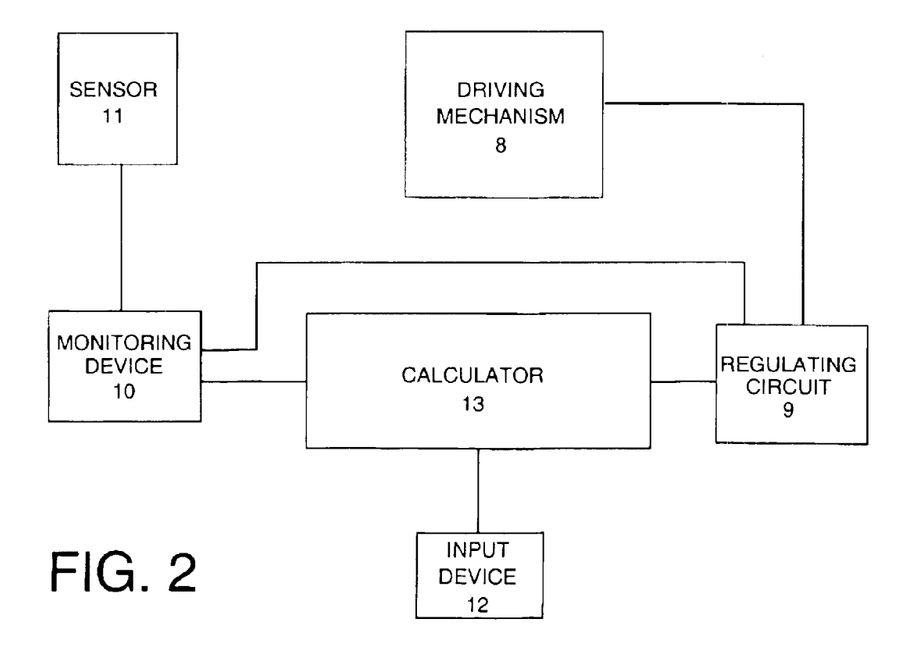

A block diagram in FIG. 2 represents a driving mechanism 8 of a data player which is used to move a reading and/or writing head (not shown) relatively to a data medium (not shown). The driving mechanism 8 may for example be realized using a motor and an endless screw as shown in FIG. 1. A speed at which the reading and/or writing head is moved may be adjusted through the driving mechanism 8. A regulating circuit 9 connected to the driving mechanism 8 allows to regulate the adjustable speed to a given value. The speed is determined using a monitoring device 10. The monitoring device 10 receives signals from a sensor 11 which senses parameters related to the movement of the reading and/or writing head. The sensor 11 may for example be realized using an encoder (not shown) which rotates together with the endless screw (not shown) as in FIG. 1, and delivers encoder signals to the monitoring device 10.

The monitoring device 10 is further used to determine a position of the data reading and/or writing head.

An input device 12 allows to transmit to a calculator 13 instructions for moving the reading and/or writing head from it's actual first position, which it is in at a moment the instruction is received, to a second position. Such instructions may for example result from a search command, for example in an audio compact disk device when a song N different from a song M being read needs to be accessed. The calculator 13 which is connected to an output of the monitoring device 10, receives monitoring information and determines the first position of the reading and/or writing head. The calculator 13 uses the information of the first and second positions to calculate a desirable speed for the reading and/or writing head at positions between the first and the second positions. The calculator 13 outputs the values of the desirable speed to the regulating circuit 9.

As mentioned above the regulating circuit 9 allows to regulate the speed of the reading and/or writing head movement to a given value, for example the desirable speed value. To attain this goal of regulating the regulating circuit 9 may for example obtain monitoring information from the monitoring device 10 and determine an instantaneous speed value of the reading and/or writing head. If the instantaneous speed value is inferior than the desirable speed then the regulating circuit 9 may increase the speed. If on the other hand the instantaneous speed value is greater than the instantaneous speed then the regulating circuit 9 may decrease the speed. Other ways of regulating the speed to the desirable speed may well be used as for example measuring and regulating values of a current flowing through the driving mechanism 8.

Figure 3:
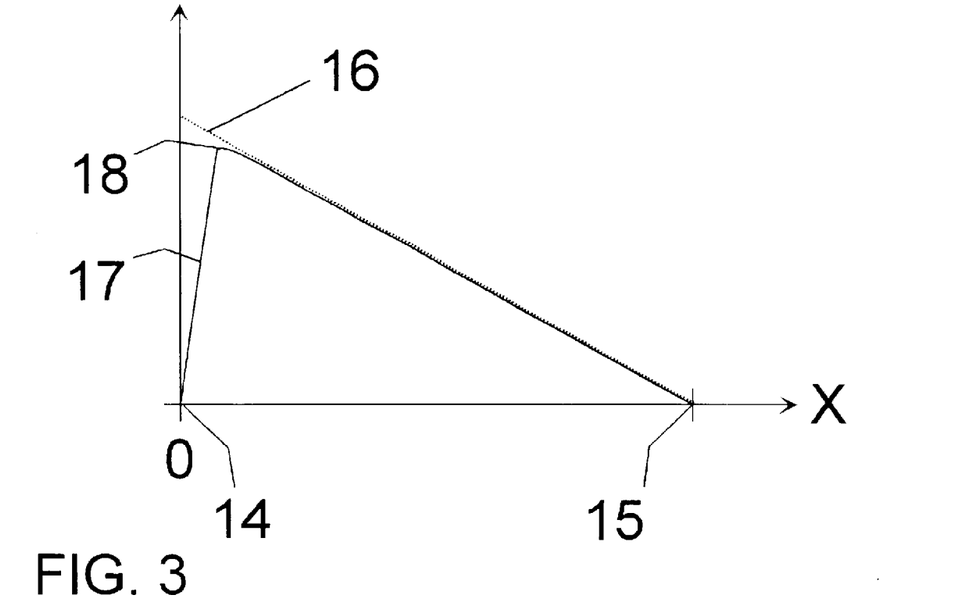
FIG. 3 shows a speed curve.

FIG. 3 shows a speed curve. The X-axis represents a position of the reading and/or writing head, 14 and 15 representing the first and the second position respectively. The Y axis represents the speed of the reading and/or writing head. A dotted line 16 represents a desirable speed curve calculated by the calculator 13 for a movement of the reading and/or writing head from the first position 14 to the second position 15. The desirable speed curve may have a shape different than a straight line. It could for example be a function of the position of the reading and/or writing head as follows:

$$V_{des} = \sqrt{(\text{second\_position} - \text{instant\_position}) * const}$$

wherein $V_{des}$ is the desirable speed, instant_position is the instantaneous position of the reading and/or writing head, and const is a constant which depends on physical parameter of the data player, e.g. weight of reading and/or writing head.

The desirable speed curve shows that the greatest value of the desirable speed curve may be found at the first position 14 and that the desirable speed is gradually decreased to reach a value substantially equal to 0 when arriving at the second position 15. Hence the reading and/or writing head will be moved relatively fast when departing from the first position 14 and should be stopped when arriving at the second position 15.

A real speed curve represented in FIG. 3 using a continuous line 17 shows the speed of the reading and/or writing head as it is regulated by the regulating circuit 9. The real speed curve 17 comprises an ascending part when departing from the first position 14 which is due to a finite time required to accelerate the reading and/or writing head to the desirable speed. Once the real speed value reaches the desirable speed value in 18, the real speed curve 17 closely follows the desirable speed curve.

Figure 4:
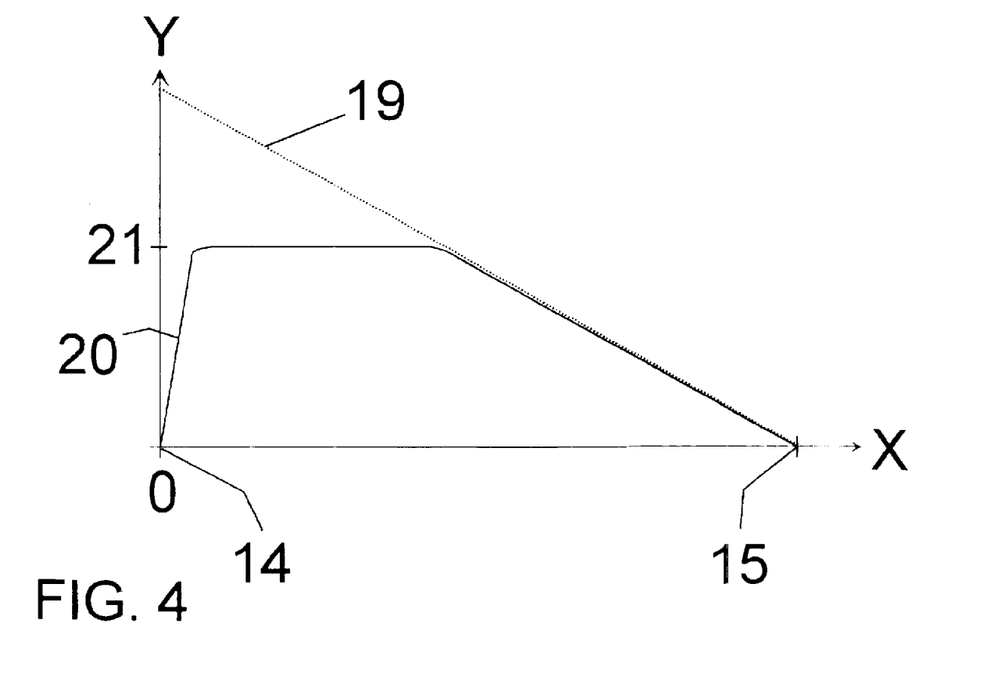

FIG. 4 shows a speed curve in a case where the first position 14 and the second position 15 are more distant from each other than in a case depicted in FIG. 3. Again the X axis represents a position of the reading and/or writing head and the Y axis the speed of the reading and/or writing head. A dotted line 19 represents a desirable speed curve calculated by the calculator 13 for a movement of the reading and/or writing head from the first position 14 to the second position 15 and a continuous line 20 represents the real speed curve of the speed which the reading and/or writing head has when moved from the first position 14 to the second position 15. The real speed curve 20 comprises an ascending part when departing from the first position 14 which is due to a finite time required to accelerate the reading and/or writing head to the desirable speed. However due to specifications of the driving mechanism the reading and/or writing head may not exceed a maximum speed value 21 represented on the Y axis. Thus the real speed remains at the maximum value until a position 22 on the X axis is reached where the maximum speed equals the desirable speed value. From thereon and until the second position is reached the real speed curve 20 closely follows the desirable speed curve 19.

The examples illustrated in FIG. 3 and FIG. 4 show that a real speed at the first position is 0 but it would easily be possible to conceive a curve for a case in which the speed at the first position has a value different from 0 and that the real speed curve departs from that value different from 0.

Figure 5:
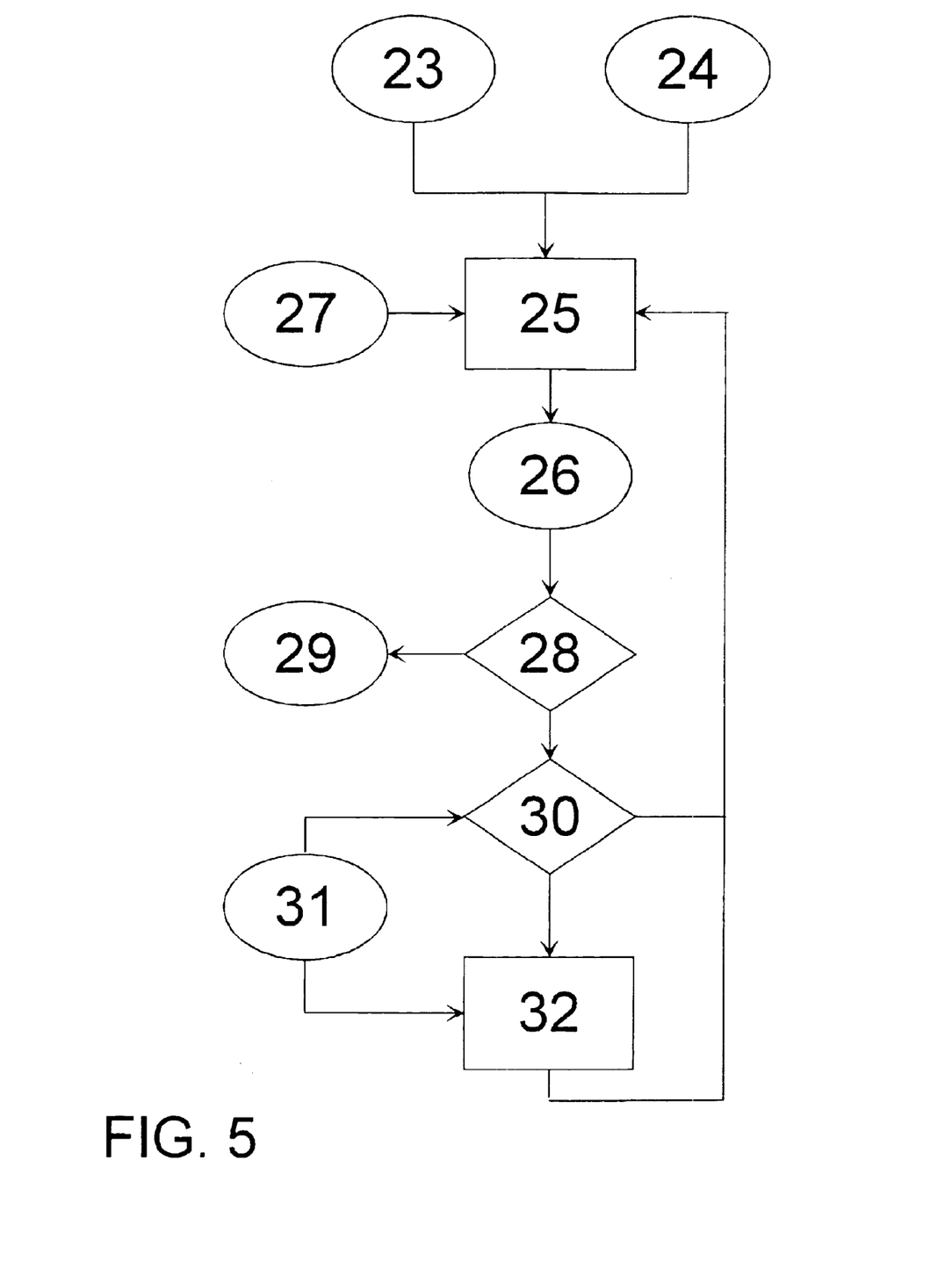

A flowchart in FIG. 5 illustrates a method which may be implemented when using the data player shown in FIG. 2. A begin instruction 23 and an input of the second position value 24 are used in a calculating 25 to calculate a desirable speed 26 using an actual position value 27. At the moment where the begin instruction 23 is given the actual position value 27 may have the first position value. A case study 28 checks if the actual position value 27 is equal to the second position and goes into a ready status 29 if this is the case. If the case study 28 returns a negative result, a case study 30 checks whether the real speed 31 is equal to the desirable speed 26 and if no a regulating 32 of the real speed 31 to the desirable speed value 26 is undertaken. If the case study 30 reveals that the real speed 31 is equal to the desirable speed, or once the regulating 32 is done the method returns to the calculating 25.

Variations departing from the method depicted in the flowchart of FIG. 5 may be conceived. For example the desirable speeds may be calculated in advance and stored for many possible positions between the first and the second position. This may shorten the time which lapses between successive regulating 32.

Figure 6:
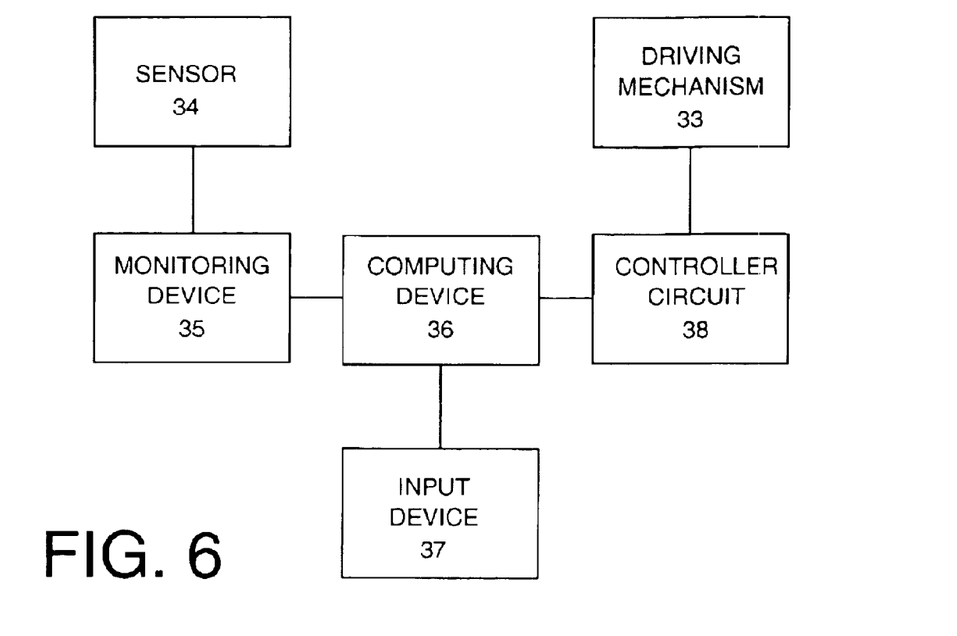

A driving mechanism 33 shown as a block in FIG. 6 may similar to the driving mechanism 8 shown in FIG. 1 move a reading and/or writing head (not shown) relatively to a data medium (not shown). The driving mechanism 33 moves the reading and/or writing head in steps having a determined steplength, i.e., each 30 step of the driving mechanism 33 results in a movement of the reading and/or writing head over a distance having a value of the steplength. In order to perform one step the driving mechanism 33 requires a defined amount of electrical energy inputted. A sensor 34 delivers sensor signals when the reading and/or writing head is moved, such that a monitoring device 35 which receives the sensor signals may deliver a measure of the reading and/or writing head's position. A computing device 36 receives an output from the monitoring device 35 and an output from an input device 37, indicating a final second position to which the reading and/or writing head is to be positioned, and determines a final number of steplengths separating an actual third position from the second position of the reading and/or writing head. The computing device 36 may for example be a digital computing device. The computing device 36 outputs a signal to a controller circuit 38 such that an amount of energy sufficient to perform the final number of steplengths is outputted to the driving mechanism 33 by the controller circuit 38.

The computing device 36 may be able to check data provided by the monitoring device 35 after the latter amount of energy has been outputted and determines a near position at which the reading and/or writing head is currently positioned. If the computing device 36 determines that the near position is separated from the second position by a last number of steps greater than a predetermined value of steplengths then the computing device 36 outputs a signal to the controller circuit 38 such that a fig second amount of energy sufficient to perform the last number of steplengths is outputted to the driving mechanism 33 by the controller circuit 38.

Figure 7:
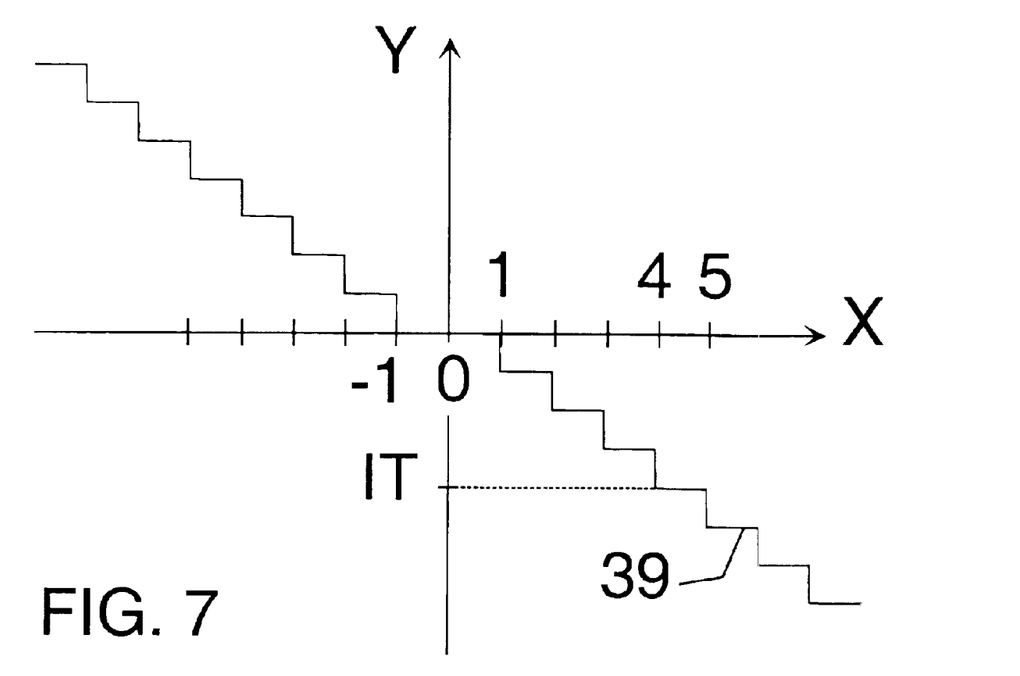

In the graph shown in FIG. 7 an X axis represents a position of the reading and/or writing head given in steplengths and relatively to the second position, represented by 0 on the X axis. The position is expressed with a positive or a negative sign depending on which direction the reading and/or writing head needs to be moved in to reach the second position. The Y axis represents an energy which needs to be outputted to the driving mechanism in order to position the reading and/or writing head at the second position. The energy may for example be supplied by applying for a given period of time a current. For example a curve 39 illustrates a value of current multiplied by the period of time, which is positive or negative depending on a sign of the current, and which needs to be applied to the driving mechanism to position the reading and/or writing head at the second position. For example a negative value IT needs to be applied to the driving mechanism if the reading and/or writing head needs to be moved from it's actual position, which may be represented on the X axis somewhere between 4 and 5, to the second position, represented by 0 on the X axis.

Figure 8:
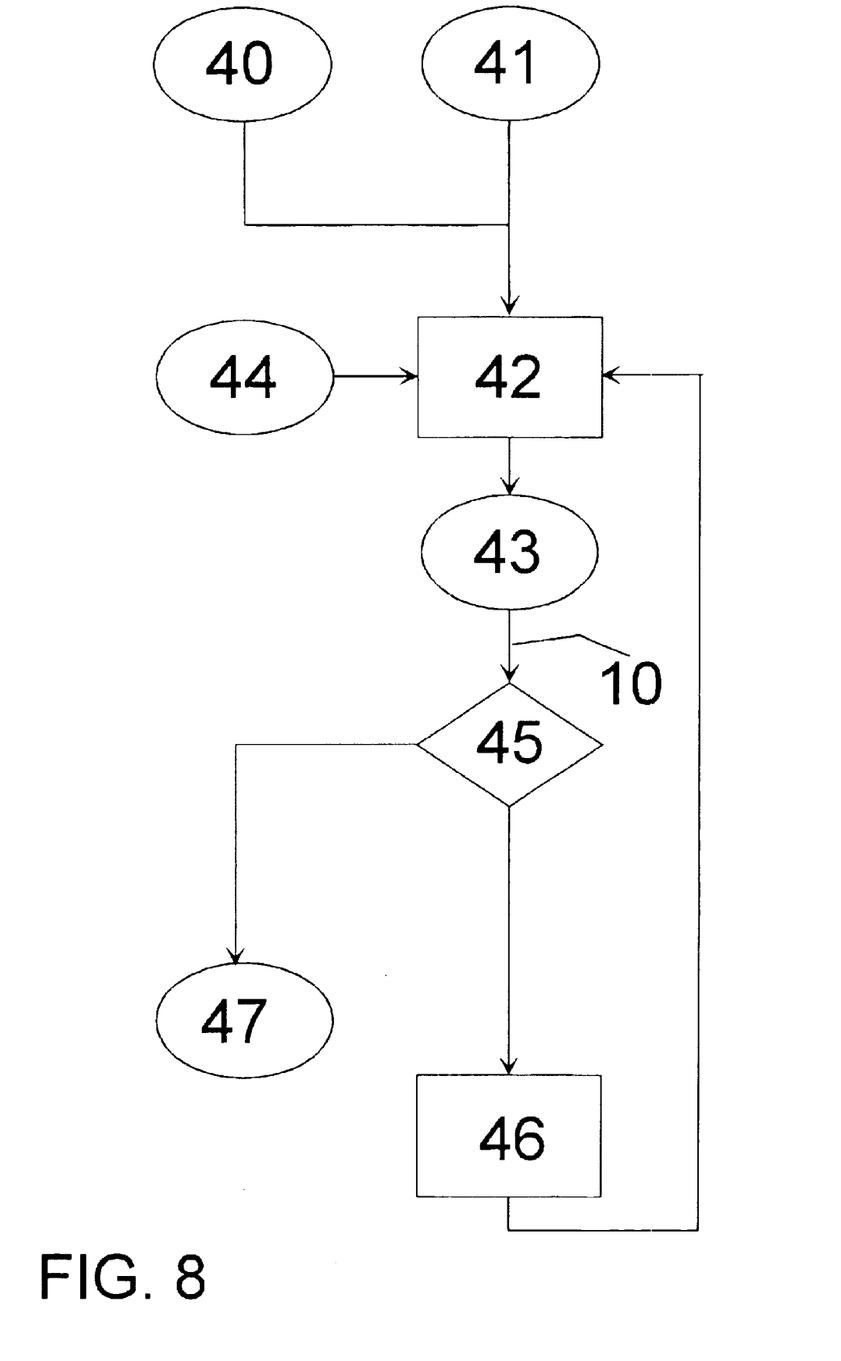

A flowchart in FIG. 8 illustrates a method which may be applied using the data player represented in FIG. 5. A begin instruction 40 and an input of the second position value 41 are used in a calculating 42 to calculate a final number of steps 43 using an actual position value 44. A case study 45 checks if the final number of steps 43 is smaller than a predetermined number of steplengths (not shown). The case study 45 is optional and may be left out. In a negative case an outputting 46 of a quantified amount of energy to a driving mechanism is performed. Subsequently a new calculating 42 is done. In case the case study 45 returns a positive answer the method goes into a ready status 47 since no movement is to be done anymore.

Figure 9:
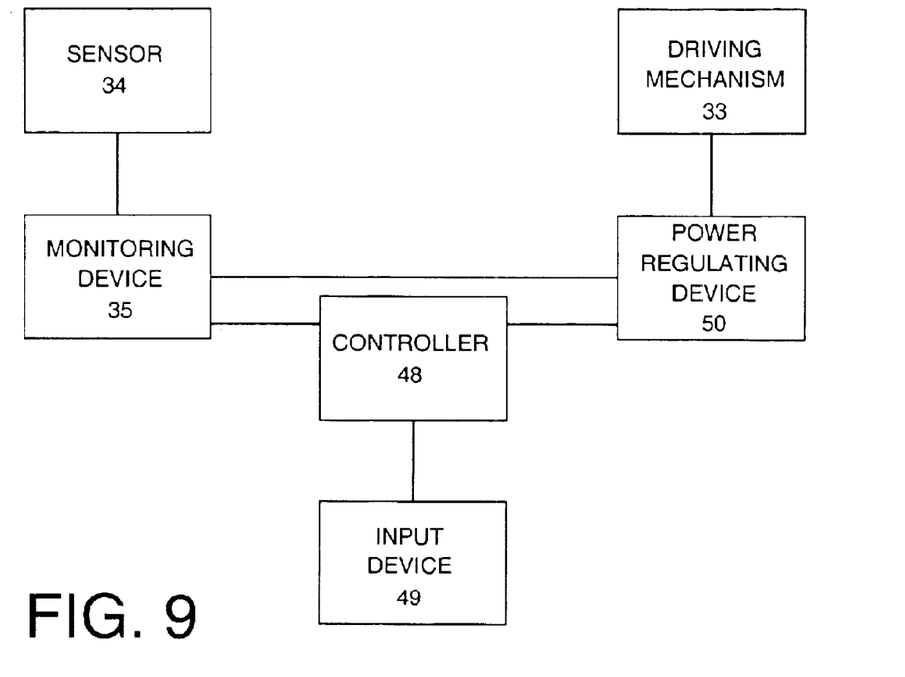

The driving mechanism 33, the sensor 34 and the monitoring device 35 shown in FIG. 9 may be the same as the ones shown in FIG. 6. A controller 48 receives a signal from an input device 49 indicating the final second position to which the reading and/or writing head is to be moved. The controller 48 further determines a current position of the reading and/or writing head and whether it has to be moved by at least one step to be positioned in the second position. If a movement is required a signal is outputted to a power regulating device 50. The power regulating device 50 may output energy to the driving mechanism 33, which may move the reading and/or writing head in steps. Typically a critical power is required such that the driving mechanism 33 performs one single step. The power regulating device 50 may monitor the position of the reading and/or writing head using signals outputted by the monitoring device 35, and increase it's power output to the driving mechanism 33 until a step is performed and reduce the power afterwards.

Figure 10:
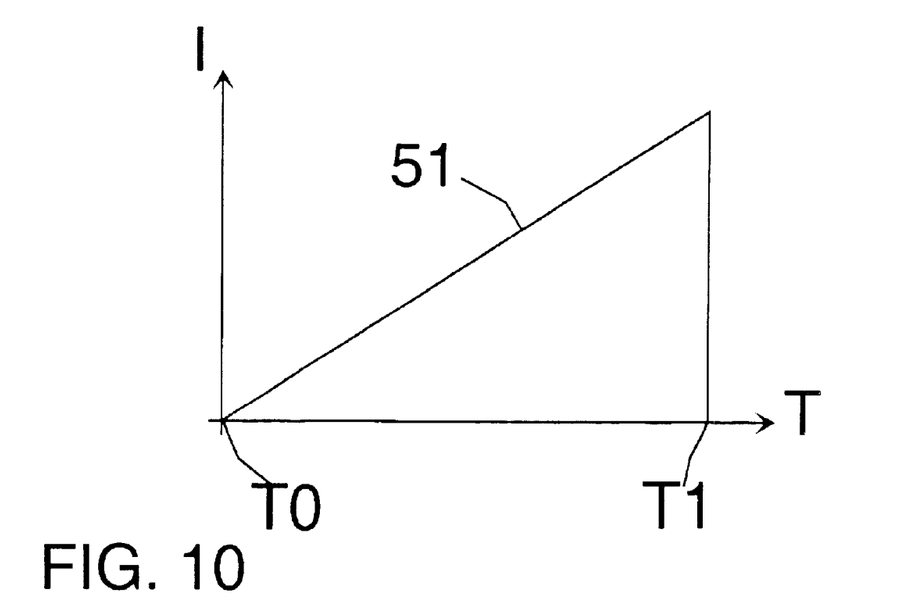

FIG. 10 shows a current curve which illustrates how the power regulating device 50 from FIG. 9 may regulate the power at the input of the driving mechanism 22. For example a current may be increased. An X axis represents time T and a Y axis represents current I supplied to the driving mechanism 22. The current is increased according to a curve 51 between instants T0 and T1. At the instant T1 one step is performed by the driving mechanism and subsequently the current is immediately decreased. The values of the current at the instants T0 and immediately after T1 may be any value which results in a power insufficient to have the driving mechanism perform a step.

Figure 11:
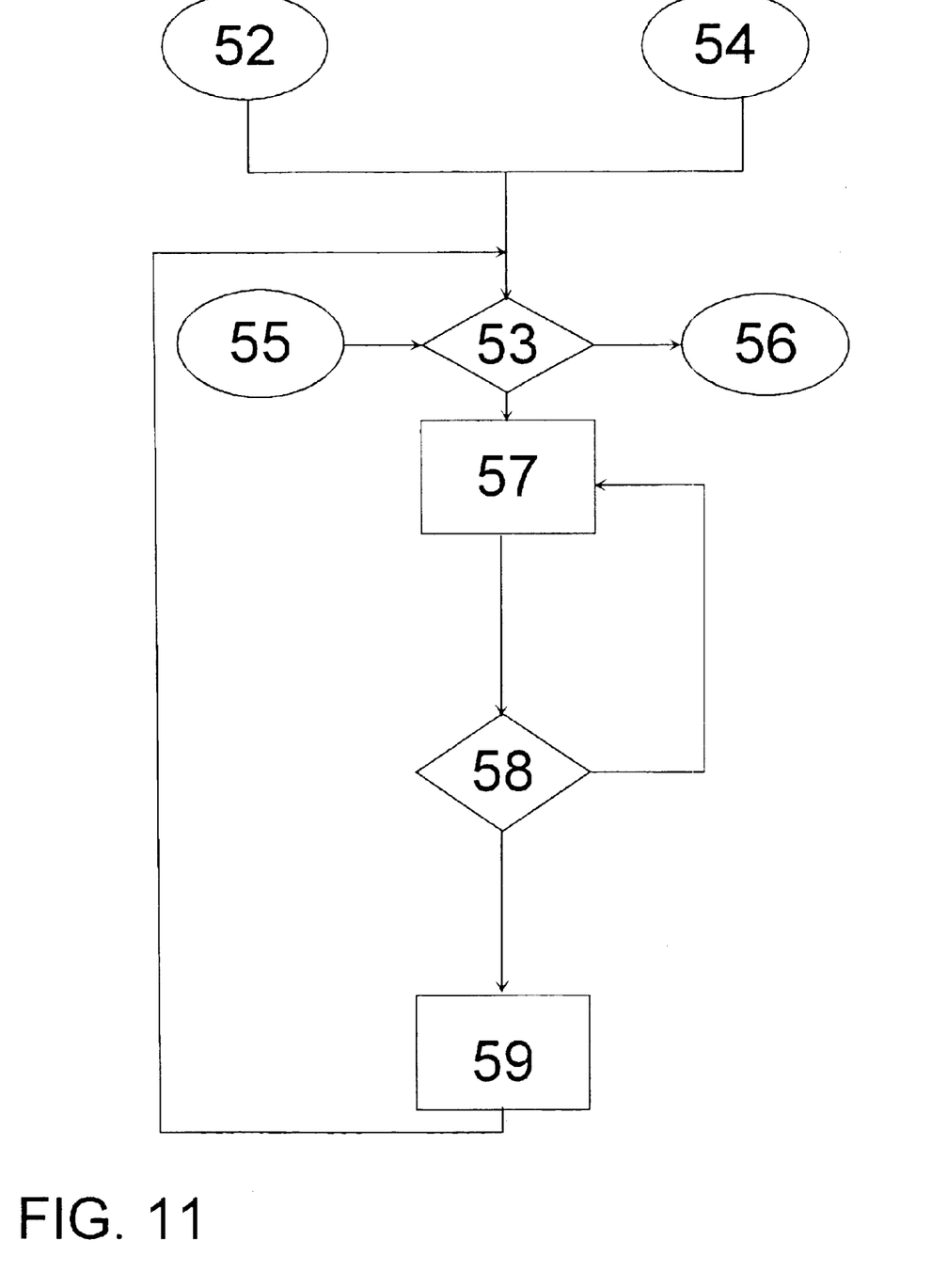

A flowchart in FIG. 11 illustrates a method which may be implemented using the data player represented in FIG. 9. A begin instruction 52 initiates a case study 53 in which an input of the second position value 54 is compared with an actual position value 55. If the second position value 54 and the actual position value 55 are equal no movement of the reading and/or writing head (not shown) needs to be done and the method goes into a ready status 56. In the opposite case an increasing 57 of power outputted to the driving mechanism (not shown) is undertaken. A movement check 58 checks if a step in the driving mechanism has been performed and if this is not the case the method returns to the increasing 57 such that the power outputted is continuously increased. If a step has been performed a decrease 59 of power outputted to the driving mechanism is undertaken and the method returns to the case study 53.

A plurality of steps may be performed until the reading and/or writing head is positioned at the second position.

Each data player and method shown and described using FIGS. 2 to 11 may be used separately to position the reading and/or writing head. As will be seen below they may also be combined.

The examples described together with FIGS. 2 to 4 are most effective when the reading and/or writing head needs to be moved along a relatively long distance from the first to the second position. The driving mechanism may use a DC-motor and determine the steps using signals from the monitoring device, or a stepmotor which allows to move the reading and/or writing head in steps of a determined steplength. Normally the positioning of the reading and/or writing head at the second position should be done with a precision of 1 step.

The examples described together with FIGS. 5 to 7 are most effective when the reading and/or writing head needs to be moved for a relatively small number of steps. Normally the positioning of the reading and/or writing head at the second position should be done with a precision of 1 step.

The examples described together with FIGS. 8 to 11 are most effective when the reading and/or writing head needs to be moved for 1 or perhaps a few steps. The positioning of the reading and/or writing head is performed step by step.

In a preferred embodiment the data players described together with FIGS. 2, 3, 4, 6 and 7, and the methods described in relation to FIGS. 5 and 8 are combined. At first the reading and/or writing head is moved to be positioned at the second position by adjusting the real speed to the desirable speed. Secondly, if the reading and/or writing head fails to be precisely positioned at the second position, it is further moved by outputting to the driving mechanism the amount of energy sufficient to perform the final number of steps still separating the reading and/or writing head from the second position, as described for FIGS. 6 to 8.

In another preferred embodiment the combination described in the previous paragraph is further combined with the data player and/or the methods described in relation to FIGS. 9 to 11. Secondly or thirdly, if the reading and/or writing head is still separated from the second position by for example one step the power outputted to the driving mechanism is regulated until a step is performed.

In any case the reading and/or writing head is advantageously positioned at the second position with an optimized speed and precision.

Figure 12:
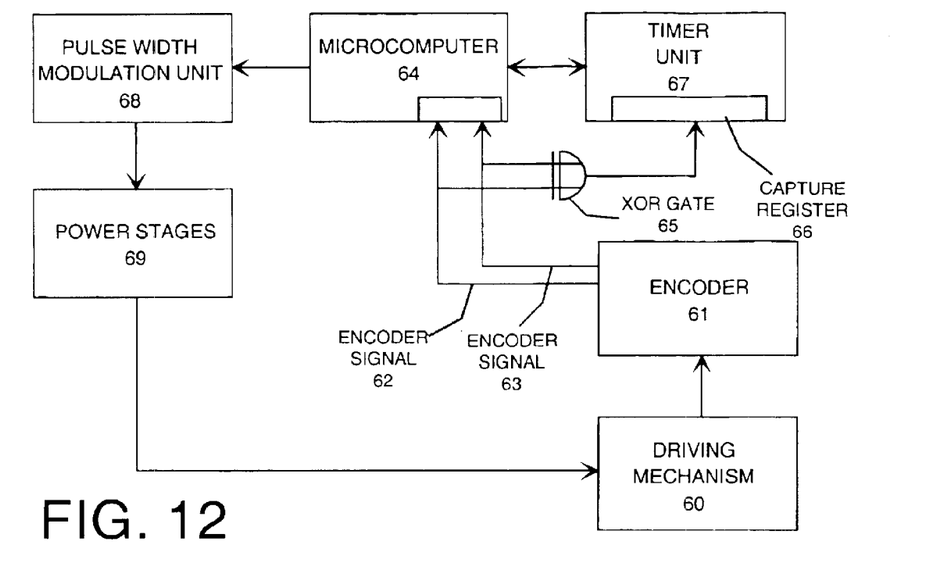

FIG. 12 shows a simplified block diagram of a data player in which a driving mechanism 60 is used to move and position a reading and/or driving head. The driving mechanism 60 may for example comprise a motor which activates and endless screw and thereby moves a slide in an optical disk player and/or recorder. The slide carries the reading and or writing head (not shown). An encoder 61 delivers encoder signals 62 and 63 while the reading and/or writing head is moved by the driving mechanism 60.

The encoder signals 62 and 63 are inputted by a microcomputer 64 where they generate interrupts. The interrupts enable the microcomputer 64 to detect changes of the encoder signals 62 and 63

The encoder signals 62 and 63 are further inputted at the inputs of a logical XOR gate 65. An output of the XOR gate 65 is received in a capture register 66 of a timer unit 67.

A connection between the microcomputer 64 and the timer unit 67 allows the microcomputer to receive the timer unit's output and to determine a real speed of the reading and/or writing head's movement.

The microcomputer 64 is connected to a pulse width modulation unit 68 which outputs signals to power stages 69. This way the microcomputer may control parameters of the driving mechanism 60 leading to a control of the reading and/or writing head's position and speed.

Figure 13:
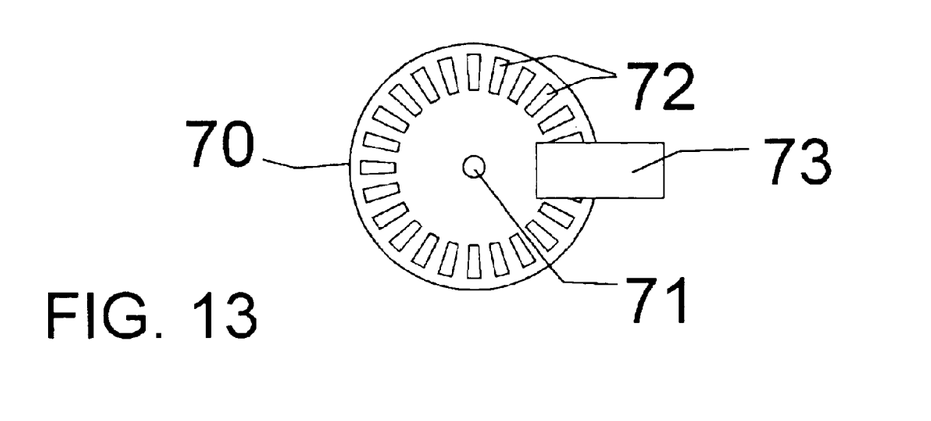

FIG. 13 contains a more detailed view of an encoder wheel 70 which may be used in the encoder 61 from FIG. 12. The encoder wheel 70 rotates around an axis 71, which is perpendicular to a plane of the drawing. The encoder wheel 70 comprises a plurality of holes 72 near to its periphery. During rotation of the encoder wheel 70 the holes 72 pass at proximity of a light barrier part 73 which comprises 2 sensors SA and SB (not shown). The sensors SA and SB allows to detect a passage of the holes and to deliver an encoder signal each accordingly.

Figure 14:
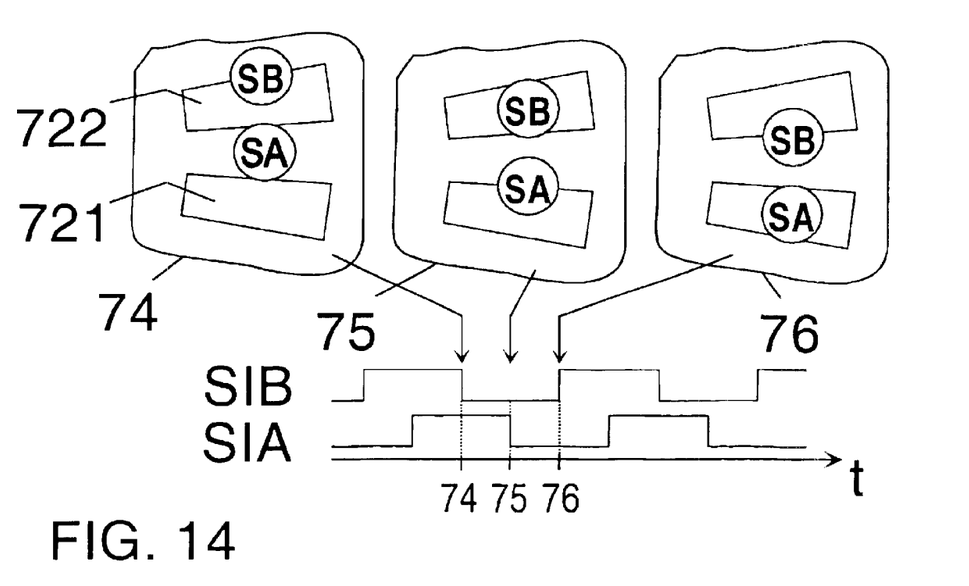

FIG. 14 illustrates schematically how the sensors SA and SB detect the passage of holes 721 and 722 and deliver encoder signals SIA and SIB. The sensors SA and SB are represented using circles for reasons of clarity. In reality the sensors SA and SB may for example be implemented using 2 light beams which shine partly or wholly through holes 722 and 721 and are measured on a side of the wheel opposite to a side from which the light beams are generated using two photodetectors. The signals SIA and SIB are an example of an output of the two photodetectors. The signals may be HIGH with a value 1 when more than half of a sensor is not above a hole 721 or 722 and LOW with a value 0 in the other case, i.e., when more than half of the sensor covers a hole. Preferably a distance between the holes and a size of the holes is such that the signal SIA and SIB have a phase difference of $\pi/2$ as is shown in FIG. 14. Three instants 74, 75 and 76 at which the holes 721 and 722 move relatively to the sensors SA and SB are represented in frames and linked to a time axis T using arrows to show values of the signals SIA and SIB resulting at these instants.

The position of the reading and/or writing head may be determined by implementing a counter which is incremented or decremented depending on the encoder signals 62 and 63. The microcomputer 64 shown in FIG. 12 may implement a method to increment or decrement a counter, as shown in FIG. 15, every time the encoder signals 62 or 63 generate an interrupt.

Figure 15:
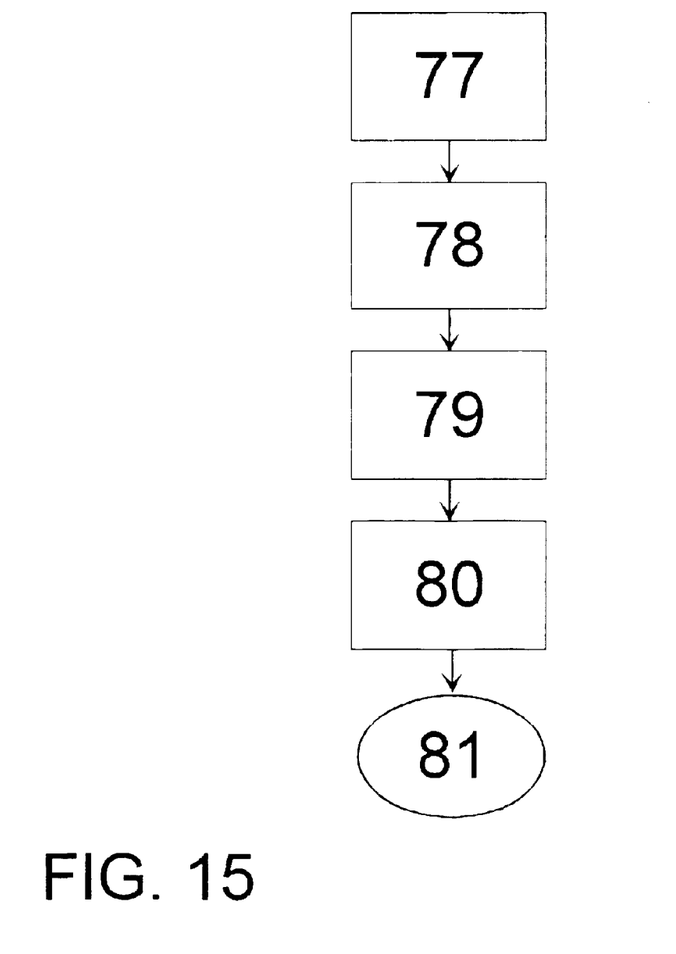

In FIG. 15, the interrupt 77 initiates a reading 78 of signals SIA and SIB. SIA and SIB may be considered to be either logical 1 or 0. A counting step 79 performs following operations and value assignments on a value of a counter C:

$C=C+(\text{not}(SIA' \text{ xor } SIB) \text{ and } (SIA \text{ xor } SIB'))$ $C=C-(\text{not}(SIA \text{ xor } SIB') \text{ and } (SIA' \text{ xor } SIB))$ in which SIA' and SIB' are values of the signals SIA and SIB at a previous interrupt, <<not>>, <<xor>> and <<and>> being logical operations well known by a person skilled in the art. As a result of the counting step 79, the counter value C is either incremented or decremented by the value 1.

A step 80 performs the assignments:

SIA'=SIA

SIB'=SIB attributing new values to SIA' and SIB' for use at a following interrupt. The method ends with a new value of the counter C in 81.

Preferably each increment or decrement of the counter C, thus each interrupt corresponds to one step performed by the driving mechanism 60 in FIG. 2. The method illustrated in FIG. 15 will be used in the methods described below to update the counter C.

Figure 16:
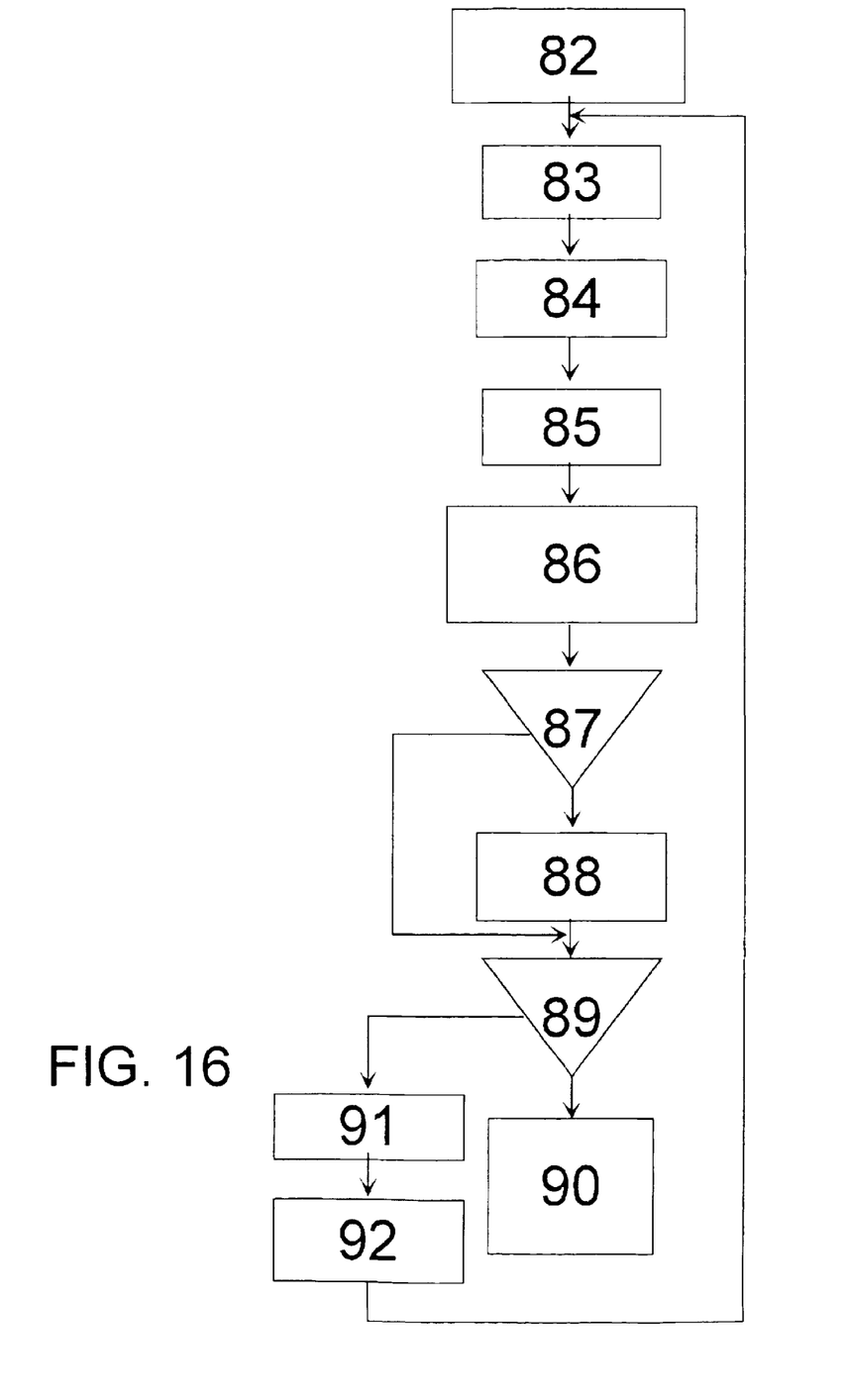

A flowchart in FIG. 16 illustrates a first method which may be implemented in the data player shown in FIG. 12. Following a start 82 the driving mechanism 60 is activated in step 83 and the reading and/or writing head starts to move. As a result the encoder 61 generates encoder signals and an interrupt is received by the microcomputer 64. The counter C is updated in step 84 using the method illustrated in FIG. 15. The microcomputer 64 receives data from the timer unit 67 and computes the reading and/or writing head's speed in step 85. A desirable speed is calculated in step 86 according for example to:

$V=SQR(\text{step}*2a*s)$ wherein V is the desirable speed, SQR(x) is a square root of x, step is a number of steps separating the reading and or writing head from its target position, $2a$ is a constant related to physical parameters of the data player and having a dimension of acceleration, and s is a value of the steplength.

V is compared in a case study 87 to a maximum speed which may be reached by the driving mechanism 60 for the reading and/or writing head. If V is greater than the maximum speed than V is set to the maximum speed in step 88. If not the case study 89 compares the actual position of the reading and/or writing head with the target position. If the reading and/or writing head is not more distant from the target position than for example 2 steps then the driving mechanism is brought to a stop in a step 90. In the opposite case an optional PID (Proportional, Integral, Differential) servo mechanism may be used in a step 91 before setting the pulse width modulation unit 68 in a step 92 in order to adjust the real speed to the desirable speed V.

When the driving mechanism is brought to a stop in step 90 there may be a positioning error due for example to a difficulty of measuring the real speed for speed values near to 0.

Figure 17:
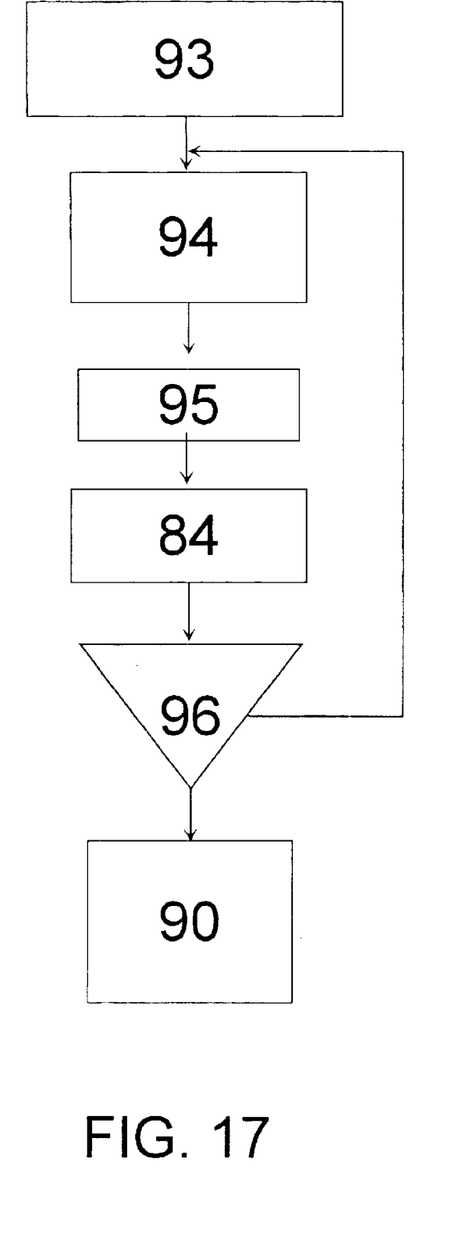

The flowchart in FIG. 17 illustrates a second method which may be implemented in the data player from FIG. 12, for example after performing the first method. Following a start 93 a motor current is calculated and outputted to the driving mechanism 60 in step 94. The driving mechanism makes the reading and/or writing head move and results in encoder signals in step 95. The counter C is updated in step 84 using the method illustrated in FIG. 15. The case study 96 compares the actual position of the reading and/or writing head with the target position. If the reading and/or writing head is not more distant from the target position than for example 1 step then the driving mechanism is brought to a stop in the step 90. In the opposite case the step 94 of calculating a motor current is repeated.

To improve a result of step 94, i.e. to increase a precision of positioning the reading and or writing head a differential part may be added to the motor current being outputted to the driving mechanism 60.

When the driving mechanism is brought to a stop in step 90 there may be a positioning error of 1 step due for example to a difficulty of outputting a right amount of motor current to the driving mechanism.

Figure 18:
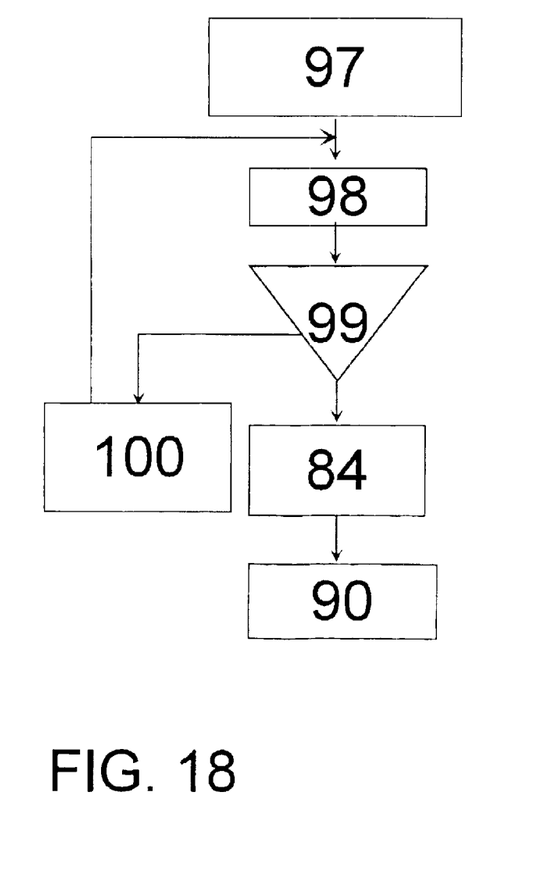

A flowchart in FIG. 18 illustrates a third method which may be implemented in the data player from FIG. 12, for example after performing the first method or the second method. Following a start 97 an interrupt flag of the microcomputer 64 is read in a step 98 to see if the encoder 61 has delivered encoder signals 62 and/or 63. If a case study 99 reveals that the interrupt flag is inactive the motor current outputted to the driving mechanism 60 is continuously increased in a step 100 and the step 98 is repeated. If the interrupt flag turn s out to be active in the case study 99 the n the counter C is updated in the step 84 and the driving mechanism is brought to a stop in the step 90 by cutting for example the motor current.

The third method applied in the data player from FIG. 12 performs a smooth one step movement of the reading and/or writing head. Since the current is increased until the step is performed, the current required to perform the step may be variable. This characteristic is particularly advantageous when effects due for example to aging affect the driving mechanism.

Typically data players as the one described in relation to FIG. 12 or FIGS. 1, 2, 6 and 9 comprise a fine positioning mechanism in addition to the driving mechanism. The driving mechanism typically allows for a positioning precision of one step, whereas the fine positioning mechanism allows to position the reading and or writing head with a precision greater than one step without activating the mechanism. Typically a positioning range of the fine positioning mechanism may be of one step but in some case a plurality of steps may apply. When the fine positioning mechanism reaches a limit of the positioning range a coarse positioning of the reading and/or driving head in the range of at least one step needs to be done using the driving mechanism. A correlating circuit which detects that the fine positioning mechanism reaches a limit of the range may deliver a signal to a current regulating device in order to implement a one step movement according to the third method or to the data player described in relation to FIGS. 9 to 11. The fine positioning mechanism is dimensioned such that it may compensate for the movement caused by the driving mechanism, i.e., a positioning of the reading and/or writing track on one precise track on the data carrier is held during coarse positioning across one step.

What is claimed is:

1. A data scanning device in which a scanning head is positioned relatively to a data medium comprising:

a driving mechanism which allows to move the data scanning head in steps, a monitoring device which allows to measure an instantaneous position of the scanning head with at least a precision corresponding to a movement of one step, a power regulating device which outputs energy to the driving mechanism, an amount of power being increased until the driving mechanism moves the data reading and/or writing head by one step, and the amount of power being reduced afterwards.

2. A data scanning device according to claim 1, wherein the monitoring device comprises an encoder which delivers a fixed number of encoder signals for each step by which the data scanning head moves.

3. A data scanning device in which a scanning head is positioned relatively to a data medium comprising:

a driving mechanism which allows to move the data scanning head in steps, a monitoring device which allows to measure an instantaneous position of the scanning head with at least a precision corresponding to a movement of one step, a power regulating device which outputs energy to the driving mechanism, an amount of power being increased until the driving mechanism moves the data reading and/or writing head by one step, and the amount of power being reduced afterwards, wherein the desirable head speed is proportional to a square root of a remaining distance separating the data scanning head from a determined final position.

4. A data scanning device according to claim 1, wherein the adjustable speed is limited to a maximum speed and in that the regulating circuit regulates the adjustable speed to the maximum speed if the maximum speed is smaller than the desirable head speed.

5. A data player and/or recorder in which a scanning head is positioned relatively to a data medium carrying data tracks, such that the data tracks may be followed by the scanning head, comprising:

a driving mechanism which allows to move the scanning head in steps, a fine positioning mechanism which allows to position the scanning head with a precision greater than one of said steps without activating the driving mechanism, a power regulating device which outputs energy to the driving mechanism, an amount of power being increased until the driving mechanism moves the scanning head by one step, and the amount of power being reduced afterwards, a correlating circuit which outputs a signal to the power regulating device depending on a state of the fine positioning mechanism.

* * * * *